(12) United States Patent
Fujikawa

(10) Patent No.: US 11,503,210 B2
(45) Date of Patent: Nov. 15, 2022

(54) BLUR CORRECTION DEVICE, IMAGING APPARATUS, MONITORING SYSTEM, AND PROGRAM

(71) Applicant: FUJIFILM Corporation, Tokyo (JP)

(72) Inventor: Tetsuya Fujikawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/403,890

(22) Filed: Aug. 17, 2021

(65) Prior Publication Data

US 2021/0377445 A1   Dec. 2, 2021

Related U.S. Application Data

(63) Continuation of application No. PCT/JP2020/006047, filed on Feb. 17, 2020.

(30) Foreign Application Priority Data

Feb. 20, 2019  (JP) .............................. JP2019-028843

(51) Int. Cl.
*H04N 5/232* (2006.01)
*H04N 5/235* (2006.01)

(52) U.S. Cl.
CPC ....... *H04N 5/23267* (2013.01); *H04N 5/2353* (2013.01); *H04N 5/23287* (2013.01)

(58) Field of Classification Search
CPC ........... H04N 5/23267; H04N 5/23287; H04N 5/2353; H04N 5/23258; H04N 5/225; H04N 5/23277; G03B 5/00
See application file for complete search history.

(56) References Cited

U.S. PATENT DOCUMENTS 9,030,566 B2   5/2015   Miyasako
10,425,584 B2  9/2019   Ikeda
(Continued)

FOREIGN PATENT DOCUMENTS

JP   H09163215    6/1997
JP   2006128781   5/2006
(Continued)

OTHER PUBLICATIONS

"International Search Report (Form PCT/ISA/210) of PCT/JP2020/006047," dated Mar. 31, 2020, with English translation thereof, pp. 1-5.
(Continued)

*Primary Examiner* — Jason A Flohre
(74) *Attorney, Agent, or Firm* — JCIPRNET

(57) ABSTRACT

A blur correction device includes: a sensor; a mechanical blur correction device; an electronic blur correction circuit that corrects the blurring by performing image processing on an image obtained through imaging of the imaging apparatus, based on the amount of blurring and operation state information about an operation state of the optical element during exposure in the imaging apparatus; and a supplementary blur correction circuit that, in a case where the mechanical blur correction device and the electronic blur correction circuit are shared and operated at a predetermined ratio during the exposure, corrects the blurring by applying, to the image, a filter determined depending on the operation state information, the predetermined ratio, the amount of blurring, and an exposure period in the imaging apparatus.

20 Claims, 11 Drawing Sheets

(56) References Cited

U.S. PATENT DOCUMENTS

| | | | |
|---|---|---|---|
| 2006/0087562 A1 | 4/2006 | Nakanishi et al. | |
| 2013/0155262 A1* | 6/2013 | Katoh | H04N 5/23287 348/208.5 |
| 2015/0002684 A1* | 1/2015 | Kuchiki | H04N 5/23261 348/208.4 |
| 2015/0195457 A1* | 7/2015 | Kim | H04N 5/23258 348/208.2 |
| 2016/0360111 A1* | 12/2016 | Thivent | H04N 5/23267 |
| 2018/0220073 A1* | 8/2018 | Keal | H04N 5/23258 |
| 2019/0104255 A1* | 4/2019 | Shi | H04N 5/23254 |
| 2019/0222762 A1* | 7/2019 | Watanabe | H04N 5/2254 |
| 2019/0281221 A1* | 9/2019 | Kuwahara | H04N 5/265 |
| 2020/0084358 A1* | 3/2020 | Nadamoto | H04N 5/23287 |
| 2020/0221031 A1* | 7/2020 | Song | H04N 5/23258 |
| 2020/0322534 A1* | 10/2020 | Lee | H04N 5/23254 |

FOREIGN PATENT DOCUMENTS

| | | | |
|---|---|---|---|
| JP | 2008124728 | | 5/2008 |
| JP | 2009111773 | | 5/2009 |
| JP | 2011102992 | | 5/2011 |
| JP | 2013135442 | | 7/2013 |
| JP | 2016024235 | | 2/2016 |
| JP | 2016173411 A | * | 9/2016 |
| JP | 2017152995 | | 8/2017 |

OTHER PUBLICATIONS

"Written Opinion of the International Searching Authority (Form PCT/ISA/237)" of PCT/JP2020/006047, dated Mar. 31, 2020, with English translation thereof, pp. 1-6.

* cited by examiner

BLUR CORRECTION DEVICE, IMAGING APPARATUS, MONITORING SYSTEM, AND PROGRAM

CROSS-REFERENCE TO RELATED APPLICATIONS

This application is a continuation application of International Application No. PCT/JP2020/006047, filed Feb. 17, 2020, the disclosure of which is incorporated herein by reference in its entirety. Further, this application claims priority under 35 USC 119 from Japanese Patent Application No. 2019-028843 filed Feb. 20, 2019, the disclosure of which is incorporated by reference herein.

BACKGROUND

1. Technical Field

A technique of the present disclosure relates to a blur correction device, an imaging apparatus, a monitoring system, and a program.

2. Related Art

In the following description, in an imaging apparatus in which an image of the subject light indicating a subject is formed on a light receiving surface through an optical system, the term "blurring" means a phenomenon in which a subject image obtained by forming the image of subject light on the light receiving surface fluctuates since a positional relationship between an optical axis of an optical system and the light receiving surface changes due to oscillation given to the imaging apparatus.

The subject image formed on the image forming surface of the imaging apparatus is roughly divided into an optical image and an image which is an electronic image. A mechanical correction unit corrects blurring of the optical image, and an electronic correction unit corrects blurring of the image. In order to correct blurring of the subject image, the amount of blur correction derived based on the detected amount of blurring is used. The mechanical correction unit corrects blurring by mechanically moving the optical system and/or the imaging element based on the amount of blur correction. The electronic correction unit corrects the blurring by cutting out the image obtained through imaging according to the blurring (for example, JP2013-135442A, JP2017-152995A, and JP1997-163215A (JP-H09-163215A)).

By the way, the noise which appears in the image due to blurring occurring during exposure cannot be removed by the electronic blur correction. This is since the electronic blur correction is processing of cutting out a part of an image region from an image and does not correspond to the blurring occurring during exposure. As a method of suppressing the noise appearing in the image due to the blurring occurring during the exposure, a method of performing mechanical blur correction during the exposure and a method of applying a filter to the image are known (for example, JP2008-124728A).

SUMMARY

According to one embodiment relating to the technique of the present disclosure, there is provided a blur correction device, an imaging apparatus, a monitoring system, and a program capable of removing noise, which appears in the image due to the blurring occurring during exposure, without relying on a mechanical blur correction unit, in a case where the mechanical blur correction unit and the electronic blur correction unit share the correction of blur.

According to a first aspect relating to the technique of the present disclosure, there is provided a blur correction device comprising: a detection unit that detects an amount of blurring of an imaging apparatus; a mechanical blur correction unit that corrects blurring by moving an optical element included in the imaging apparatus based on the amount of blurring; an electronic blur correction unit that corrects the blurring by performing image processing on an image obtained through imaging of the imaging apparatus, based on the amount of blurring and operation state information about an operation state of the optical element during exposure in the imaging apparatus; and a supplementary blur correction unit that, in a case where the mechanical blur correction unit and the electronic blur correction unit are shared and operated at a predetermined ratio during the exposure, corrects the blurring by applying, to the image, a filter determined depending on the operation state information, the predetermined ratio, the amount of blurring, and an exposure period in the imaging apparatus. As a result, in a case where the mechanical blur correction unit and the electronic blur correction unit share the correction of blurring, it is possible to remove the noise, which appears in the image due to the blurring occurring during exposure, without relying on the mechanical blur correction unit.

According to a second aspect of the technique of the present disclosure, in the blur correction device according to the first aspect, the filter is a filter that removes noise which appears in the image due to blurring occurring during the exposure. Thereby, it is possible to easily remove the noise which appears in the image due to blurring occurring during exposure, as compared with the case where the noise in the image is removed without using the filter.

According to a third aspect relating to the technique of the present disclosure, in the blur correction device according to the first aspect or the second aspect, the exposure is an exposure within one frame. As a result, in a case where the mechanical blur correction unit and the electronic blur correction unit share the correction of blurring, it is possible to remove the noise which appears in the image for one frame due to the blurring occurring during the exposure within one frame, without relying on the mechanical blur correction unit.

According to a fourth aspect of the technique of the present disclosure, in the blur correction device according to any one aspect of the first to third aspects, the operation state information is information including at least one of a period in which the optical element is moving during the exposure period or a period in which the optical element is not moving during the exposure period. As a result, as compared with the case where neither the period in which the optical element is moving during the exposure period nor the period in which the optical element is not moving during the exposure period is included in the operation state information, it is possible to improve the accuracy of blur correction by each of the electronic blur correction unit and the supplementary blur correction unit.

According to a fifth aspect of the technique of the present disclosure, in the blur correction device according to any one aspect of the first to fourth aspects, the operation state information is information including information that is capable of specifying a movement locus of the optical element during the exposure period. As a result, it is possible to remove the noise in the image with higher accuracy than in the case of removing the noise in the image by using information regardless of the movement locus of the optical element during the exposure period.

According to a sixth aspect relating to the technique of the present disclosure, in the blur correction device according to any one aspect of the first to fifth aspects, the image processing is processing including processing of cutting out the image in accordance with a cutout position determined depending on the operation state information, the ratio, and the amount of blurring. As a result, blurring can be corrected with higher accuracy than in the case where processing of cutting out the image is performed in accordance with a cutout position determined regardless of the operation state information, the predetermined ratio, and amount of blurring.

According to a seventh aspect relating to the technique of the present disclosure, in the blur correction device according to any one aspect of the first to sixth aspects, the optical element is at least one of an imaging element in which subject light indicating a subject is imaged by an optical member or the optical member. As a result, in a case where the optical element is an imaging element, the blurring can be corrected within the movable range of the imaging element. In a case where the optical element is an optical member, the blurring can be corrected within the movable range of the optical member. In a case where the optical element is an imaging element and an optical member, blurring can be corrected within the movable range of each of the imaging element and the optical member.

According to an eighth aspect relating to the technique of the present disclosure, in the blur correction device according to any one aspect of the first to seventh aspects, the detection unit detects the amount of blurring for each of a plurality of frequencies of the blurring, and the ratio is determined depending on the frequency. As a result, by detecting the amount of blurring for each of a plurality of frequencies, it is possible to correct blurring with higher accuracy than in a case where the blurring is corrected using only the amount of blurring for one frequency.

According to a ninth aspect relating to the technique of the present disclosure, in the blur correction device according to any one aspect of the first to seventh aspects, the detection unit detects the amount of blurring in each of a pair of axial directions, and the ratio is determined depending on the axial direction. As a result, the blurring can be corrected with higher accuracy than in the case where the blurring is corrected by using only the amount of blurring in one axial direction.

A tenth aspect relating to the technique of the present disclosure includes: the blur correction device according to any one aspect of first to ninth aspects; and an imaging unit that generates the image through imaging. As a result, in a case where the mechanical blur correction unit and the electronic blur correction unit share the correction of blurring, it is possible to remove the noise, which appears in the image due to the blurring occurring during exposure, without relying on the mechanical blur correction unit.

According to an eleventh aspect relating to the technique of the present disclosure, there is provided a monitoring system comprising: the imaging apparatus according to tenth aspect; and a control device that performs at least one of control of causing a display unit to display the image on which a correction result of the supplementary blur correction unit is reflected or control of causing a storage unit to store the image data indicating the image on which the correction result is reflected. As a result, in a case where the mechanical blur correction unit and the electronic blur correction unit share the correction of blurring, it is possible to remove the noise, which appears in the image due to the blurring occurring during exposure, without relying on the mechanical blur correction unit.

According to a twelfth aspect relating to the technique of the present disclosure, there is provided a program causing a computer to function as a mechanical blur correction unit, an electronic blur correction unit, and a supplementary blur correction unit which are included in the blur correction device according to any one aspect of the first to ninth aspects. As a result, in a case where the mechanical blur correction unit and the electronic blur correction unit share the correction of blurring, it is possible to remove the noise, which appears in the image due to the blurring occurring during exposure, without relying on the mechanical blur correction unit.

According to a thirteenth aspect relating to the technique of the present disclosure, there is provided a blur correction device comprising: a sensor; and a processor. The processor executes mechanical blur correction processing of correcting blurring by moving an optical element included in an imaging apparatus based on an amount of blurring detected by a detection unit that detects the amount of blurring of the imaging apparatus; electronic blur correction processing of correcting the blurring by performing image processing on an image obtained through imaging of the imaging apparatus, based on the amount of blurring and operation state information about an operation state of the optical element during exposure in the imaging apparatus; and supplementary blur correction processing of correcting, in a case where the mechanical blur correction processing and the electronic blur correction processing are shared and operated at the predetermined ratio during the exposure, the blurring by applying, to the image, a filter determined depending on the operation state information, the predetermined ratio, the amount of blurring, and exposure period in the imaging apparatus.

BRIEF DESCRIPTION OF THE DRAWINGS

Exemplary embodiments of the technology of the disclosure will be described in detail based on the following figures, wherein.

DETAILED DESCRIPTION

An example of an embodiment relating to the technique of the present disclosure will be described with reference to the accompanying drawings.

First, the wording used in the following description will be described.

CPU refers to the abbreviation of "Central Processing Unit". RAM refers to the abbreviation of "Random Access Memory". ROM refers to the abbreviation of "Read Only Memory".

ASIC refers to the abbreviation of "Application Specific Integrated Circuit". PLD refers to the abbreviation of "Programmable Logic Device". FPGA refers to the abbreviation of "Field-Programmable Gate Array". AFE refers to the abbreviation of "Analog Front End". DSP refers to the abbreviation of "Digital Signal Processor". SoC refers to the abbreviation of "System-on-a-chip".

SSD refers to the abbreviation of "Solid State Drive". DVD-ROM refers to the abbreviation of "Digital Versatile Disc Read Only Memory". USB refers to the abbreviation of "Universal Serial Bus". HDD refers to the abbreviation of "Hard Disk Drive". EEPROM refers to the abbreviation of "Electrically Erasable and Programmable Read Only Memory".

CCD refers to the abbreviation of "Charge Coupled Device". CMOS refers to the abbreviation of "Complementary Metal Oxide Semiconductor". EL refers to the abbreviation of "Electro-Luminescence". A/D refers to the abbreviation of "Analog/Digital". I/F refers to the abbreviation of "Interface". UI refers to the abbreviation of "User Interface". WAN refers to the abbreviation of "Wide Area Network".

FIR refers to the abbreviation of "Finite Impulse Response". IIR refers to the abbreviation of "Infinite Impulse Response". SNR refers to, for example, the abbreviation of "Signal-to-Noise-Ratio". Further, in the following description, in a case where the term "image" other than the "image" displayed on the display is used, the "image" also includes the meaning of "data indicating the image".

Figure 1:
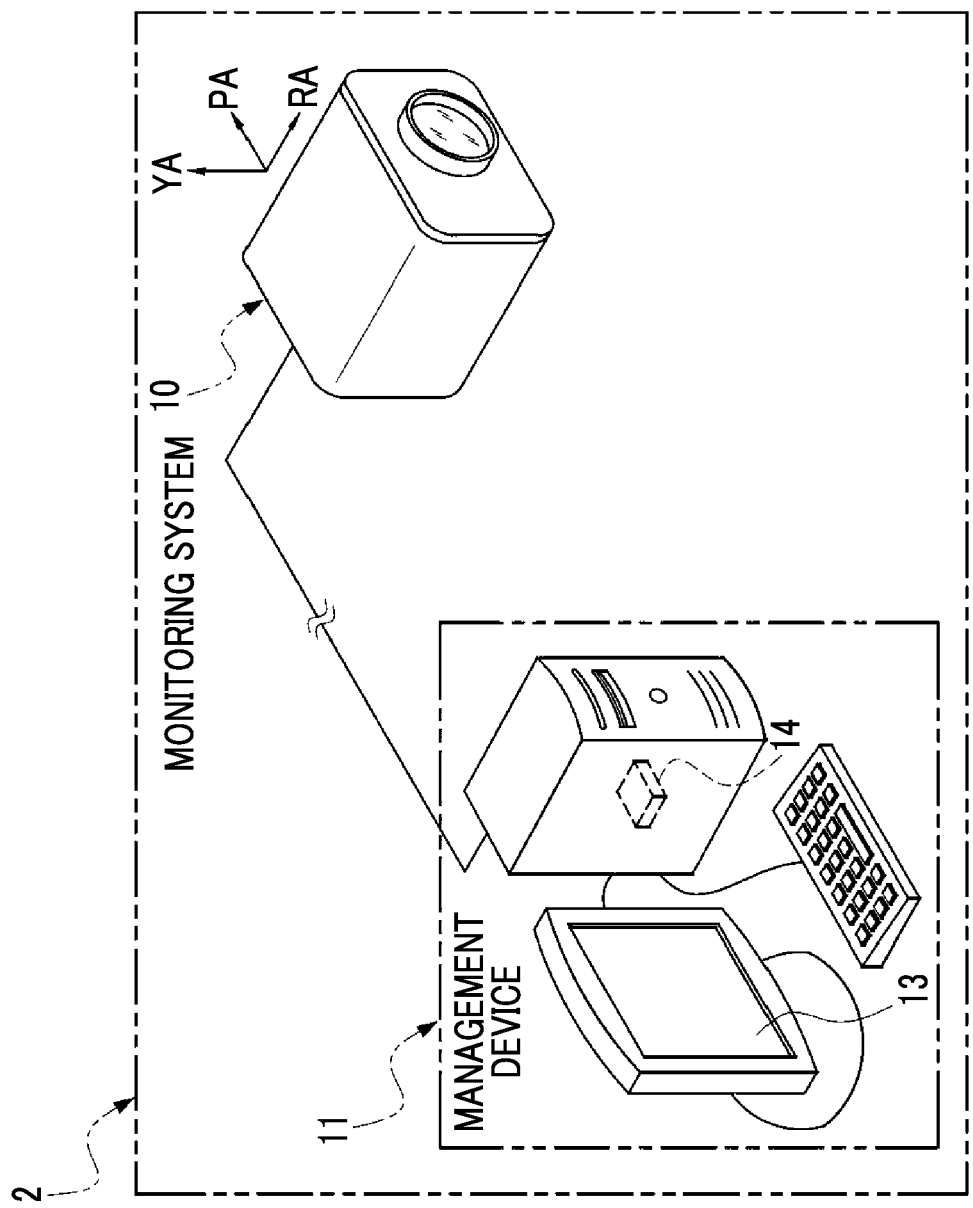
FIG. 1 is a schematic configuration diagram showing an example of a configuration of a monitoring system according to an embodiment.

In FIG. 1, the monitoring system 2 includes a surveillance camera 10 and a management device 11. The monitoring system 2 is an example of the "monitoring system" relating to the technique of the present disclosure, and the surveillance camera 10 is an example of the "imaging apparatus" relating to the technique of the present disclosure.

The surveillance camera 10 is installed on a pillar or wall in indoor and outdoor situations, captures an image of a monitoring target as a subject, and generates a moving image through imaging. The moving image includes a multi-frame image obtained through imaging. The surveillance camera 10 transmits the moving image, which is obtained through imaging to the management device 11, through the communication line 12.

The management device 11 includes a display 13 and a secondary storage device 14. Examples of the display 13 include a liquid crystal display and an organic EL display. The display 13 is an example of a "display unit (display)" relating to the technique of the present disclosure.

An HDD is mentioned as an example of the secondary storage device 14. The secondary storage device 14 may be a non-volatile memory such as a flash memory, SSD, or EEPROM instead of an HDD. The secondary storage device 14 is an example of a "storage unit (memory)" relating to the technique of the present disclosure.

In the management device 11, the moving image transmitted by the surveillance camera 10 is received, and the received moving image is displayed on the display 13 or stored in the secondary storage device 14.

Figure 2:
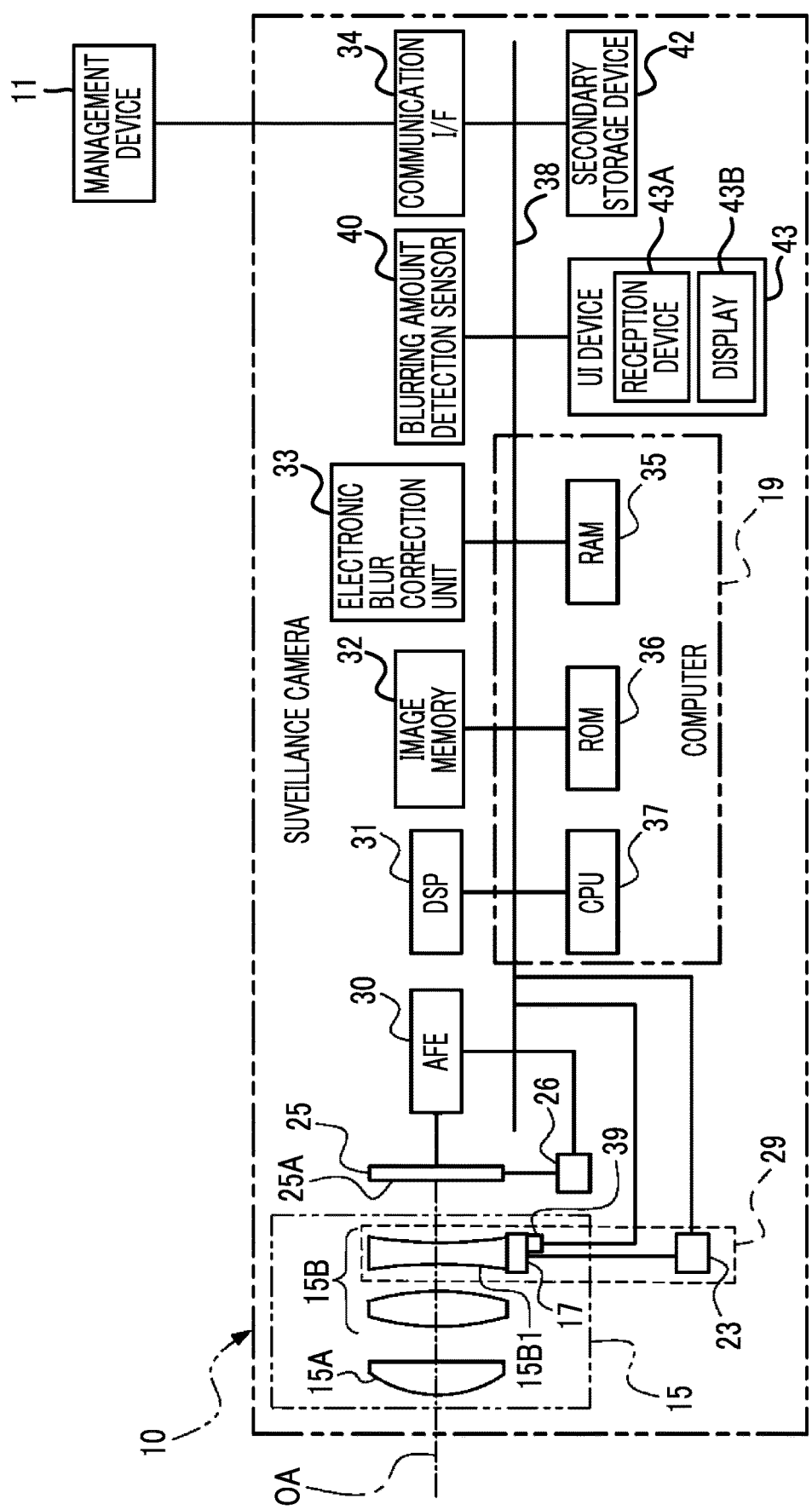
FIG. 2 is a block diagram showing an example of a configuration of an optical system and an electrical system of a surveillance camera according to the embodiment.

As an example, as shown in FIG. 2, the surveillance camera 10 includes an optical system 15 and an imaging element 25. The imaging element 25 is located after the optical system 15. The optical system 15 includes an objective lens 15A and a lens group 15B. The objective lens 15A and the lens group 15B are arranged in a range from the monitoring target side to the light receiving surface 25A side of the imaging element 25 along the optical axis OA of the optical system 15 in the order of the objective lens 15A and the lens group 15B. The lens group 15B includes a focusing lens, a zoom lens, and the like that can be moved along the optical axis OA. The focusing lens and the zoom lens move along the optical axis OA in accordance with the applied power. Further, the lens group 15B includes an anti-oscillation lens 15B1. The anti-oscillation lens 15B1 fluctuates in the direction perpendicular to the optical axis of the anti-oscillation lens 15B1 in accordance with the applied power. The anti-oscillation lens 15B1 is an example of an "optical element" and an "optical member" relating to the technique of the present disclosure. The meaning of vertical in the present embodiment includes not only the meaning of perfect vertical but also the meaning of substantially vertical including errors allowed in design and manufacturing.

With the optical system 15 configured in such a manner, an image of the monitoring target light indicating the monitoring target is formed on the light receiving surface 25A. The imaging element 25 is an example of an "imaging unit (image sensor)" relating to the technique of the present disclosure. Here, a CCD image sensor is employed as the imaging element 25, but this is only an example, and the imaging element 25 may be another image sensor such as a CMOS image sensor.

By the way, the oscillation given to the surveillance camera 10 includes oscillation caused by the passage of automobiles, oscillation caused by wind, oscillation caused by road construction, and the like in the outdoor situation, and includes oscillation caused by the operation of an air conditioner and oscillation due to the comings and goings of people in the indoor situation. Therefore, in the surveillance camera 10, blurring occurs due to the oscillation given to the surveillance camera 10 (hereinafter, also simply referred to as "oscillation").

In the present embodiment, the "blurring" refers to a phenomenon in which the digital image fluctuates due to a change in the positional relationship between the optical axis OA and the light receiving surface 25A in the surveillance camera 10. In other words, it can be said that "blurring" is a phenomenon in which the optical image obtained by forming an image on the light receiving surface 25A fluctuates due to the tilt of the optical axis OA due to oscillation.

The fluctuation of the optical axis OA means that the optical axis OA is tilted with respect to the reference axis (for example, the optical axis OA before blurring occurs).

Therefore, the surveillance camera 10 comprises a mechanical blur correction unit 29 in order to correct the blurring. That is, the mechanical blur correction unit 29 is used for blur correction. The mechanical blur correction unit 29 and the operation control unit 37A (refer to FIG. 4) described later are examples of the "mechanical blur correction unit (mechanical blur correction device)" relating to the technique of the present disclosure. The mechanical blur correction unit is a device that performs mechanical blur correction processing, that is, a device that performs so-called optical image stabilization (OIS). Although OIS is illustrated here, it may be a device that performs body image stabilization (BIS) instead of OIS, or a device that performs OIS and BIS. In the present embodiment, the term "blur correction" includes not only the meaning of eliminating blurring but also the meaning of reducing blurring.

The mechanical blur correction unit 29 includes an anti-oscillation lens 15B1, an actuator 17, a driver 23, and a position detection sensor 39. The anti-oscillation lens 15B1 is an example of an "optical element" relating to the technique of the present disclosure.

As a method of correcting blurring by the mechanical blur correction unit 29, various well-known methods can be adopted. In the present embodiment, as a method of correcting blur, a method of correcting blurring by moving the anti-oscillation lens 15B1 based on the amount of blurring detected by the blurring amount detection sensor 40 (described later) is adopted. Specifically, the blur correction is performed by moving the anti-oscillation lens 15B1 by the amount of the blurring in the direction of eliminating the blurring.

An actuator 17 is attached to the anti-oscillation lens 15B1. The actuator 17 is a shift mechanism equipped with a voice coil motor, and drives the voice coil motor to fluctuate the anti-oscillation lens 15B1 in the direction perpendicular to the optical axis of the anti-oscillation lens 15B1. Here, as the actuator 17, a shift mechanism equipped with a voice coil motor is employed, but the technique of the present disclosure is not limited to this, and instead of the voice coil motor, other power sources such as a stepping motor or a piezo element may be applied.

The actuator 17 is controlled by the driver 23. In a case where the actuator 17 is driven under the control of the driver 23, the position of the anti-oscillation lens 15B1 mechanically fluctuates with respect to the optical axis OA.

The position detection sensor 39 detects the current position of the anti-oscillation lens 15B1 and outputs a position signal indicating the detected current position. Here, as an example of the position detection sensor 39, a device including a Hall element is employed. Here, the current position of the anti-oscillation lens 15B1 refers to the current position in the two-dimensional plane of the anti-oscillation lens. The anti-oscillation lens two-dimensional plane refers to a two-dimensional plane perpendicular to the optical axis of the anti-oscillation lens 15B1. In the present embodiment, a device including a Hall element is employed as an example of the position detection sensor 39, but the technique of the present disclosure is not limited to this, and instead of the Hall element, a magnetic sensor, a photo sensor, or the like may be employed.

The surveillance camera 10 comprises a computer 19, a driver 26, an AFE 30, a DSP 31, an image memory 32, an electronic blur correction unit 33, a communication I/F 34, a blurring amount detection sensor 40, a secondary storage device 42, and a UI device 43. The computer 19 comprises a RAM 35, a ROM 36, and a CPU 37. The computer 19 is an example of a "computer" relating to the technique of the present disclosure. Further, the electronic blur correction unit 33 and the operation control unit 37A (refer to FIG. 4) described later are examples of the "electronic blur correction unit (electronic blur correction circuit)" relating to the technique of the present disclosure. The electronic blur correction unit is a processor (EIS processor) that performs electronic blur correction processing, that is, a so-called "electric image stabilization (EIS)".

The driver 26, the AFE 30, the DSP 31, the image memory 32, the electronic blur correction unit 33, the communication I/F 34, the RAM 35, the ROM 36, the CPU 37, the blurring amount detection sensor 40, the secondary storage device 42, and the UI device 43 are connected to a bus line 38. The driver 23 is also connected to the bus line 38.

Various programs for the surveillance camera 10 are stored in the ROM 36. The CPU 37 reads various programs from the ROM 36 and develops the read various programs into the RAM 35. The CPU 37 controls the entire surveillance camera 10 according to various programs developed in the RAM 35.

Each of the driver 26 and the AFE 30 is connected to the imaging element 25. The imaging element 25 captures an image of the monitoring target at a predetermined frame rate under the control of the driver 26. The "predetermined frame rate" described herein refer to, for example, several frames/second to several tens of frames/second.

The light receiving surface 25A is formed by a plurality of photosensitive pixels (not shown) arranged in a matrix. In the imaging element 25, each photosensitive pixel is exposed, and photoelectric conversion is performed for each photosensitive pixel. The electric charge obtained by performing photoelectric conversion for each photosensitive pixel is an analog imaging signal indicating a monitoring target, and is accumulated in the imaging element 25 as an analog image. Each photosensitive pixel is reset by the driver 26 under the control of the CPU 37 at a timing such as before and after the analog image is read out. The exposure period for each photosensitive pixel is determined depending on the shutter speed, and the shutter speed is adjusted by controlling the reset timing and the reading timing of the analog image for each photosensitive pixel.

A vertical synchronization signal and a horizontal synchronization signal are input to the imaging element 25 from the driver 26. The vertical synchronization signal is a signal that defines the timing at which transmission of an analog image for one frame is started. The horizontal synchronization signal is a signal that defines the timing at which the output of an analog image for one horizontal line is started. The imaging element 25 starts outputting the analog image to the AFE 30 in frame units in accordance with the vertical synchronization signal which is input from the driver 26, and then starts outputting the analog image to the AFE 30 in horizontal line units in accordance with the horizontal synchronization signal which is input from the driver 26.

The AFE 30 receives the analog image from the imaging element 25. In other words, the analog image is read from the imaging element 25 by the AFE 30. The AFE 30 generates a digital image, which is a digital imaging signal, by performing analog signal processing such as sampling two correlation pile and gain adjustment on the analog image and then performing A/D conversion. That is, in the surveillance camera 10, the monitoring target is imaged by the imaging element 25. Therefore, a digital image indicating the monitoring target can be obtained. Here, the digital image is an example of an "image" relating to the technique of the present disclosure.

In the example shown in FIG. 2, the AFE 30 is provided outside the imaging element 25, but the technique of the present disclosure is not limited to this, and the AFE 30 may be integrally incorporated in the imaging element 25.

The DSP 31 performs various kinds of digital signal processing on the digital image. The various kinds of digital signal processing refer to, for example, demosaic processing, noise removal processing, gradation correction processing, color correction processing, and the like. The DSP 31 outputs a digital image after digital signal processing to the image memory 32 for each frame. The image memory 32 stores a digital image from the DSP 31.

The blurring amount detection sensor 40 is, for example, a device including a gyro sensor, and detects the amount of blurring of the surveillance camera 10. In other words, the blurring amount detection sensor 40 detects the amount of blurring in each of the pair of axial directions. The gyro sensor detects the amount of rotational blurring around each axis (refer to FIG. 1) of the pitch axis PA, the yaw axis YA, and the roll axis RA (the axis parallel to the optical axis OA). The blurring amount detection sensor 40 detects the amount of blurring of the surveillance camera 10 by converting the amount of rotational blurring around the pitch axis PA and the amount of rotational blurring around the yaw axis YA detected by the gyro sensor into the amount of blurring in a two-dimensional plane parallel to the pitch axis PA and the yaw axis YA. The blurring amount detection sensor 40 is an example of a "detection unit (sensor)" relating to the technique of the present disclosure. The direction of the pitch axis PA and the direction of the yaw axis YA are examples of "a pair of axial directions" relating to the technique of the present disclosure. The meaning of parallel in the present embodiment includes not only the meaning of perfect parallel but also the meaning of approximately parallel including errors allowed in design and manufacturing.

Although the gyro sensor is mentioned here as an example of the blurring amount detection sensor 40, this is just an example, and the blurring amount detection sensor 40 may be an acceleration sensor. The acceleration sensor detects the amount of blurring in a two-dimensional plane parallel to the pitch axis PA and the yaw axis YA. The blurring amount detection sensor 40 outputs the detected amount of blurring to the CPU 37.

Further, although an example in which the amount of blurring is detected by a physical sensor called the blurring amount detection sensor 40 is given here, the technique of the present disclosure is not limited to this. For example, the movement vector obtained by comparing the digital images which are stored in the image memory 32 and are previous and subsequent in time series may be used as the amount of blurring. Further, the amount of blurring finally used may be derived based on the amount of blurring detected by the physical sensor and the movement vector obtained by the image processing.

The CPU 37 acquires the amount of blurring detected by the blurring amount detection sensor 40, and controls the mechanical blur correction unit 29 and the electronic blur correction unit 33 based on the acquired amount of blurring. The amount of blurring detected by the blurring amount detection sensor 40 is used for blur correction by each of the mechanical blur correction unit 29 and the electronic blur correction unit 33.

The electronic blur correction unit 33 is a device including an ASIC. The electronic blur correction unit 33 corrects blurring by performing image processing on the digital image in the image memory 32 based on the amount of blurring detected by the blurring amount detection sensor 40.

Here, a device including an ASIC is illustrated as the electronic blur correction unit 33, but the technique of the present disclosure is not limited to this, and for example, a device including an FPGA or PLD may be used. Further, for example, the electronic blur correction unit 33 may be a device including a plurality of ASICs, FPGAs, and PLDs. Further, as the electronic blur correction unit 33, a computer including a CPU, a ROM, and a RAM may be employed. The number of CPUs may be singular or plural. Further, the electronic blur correction unit 33 may be realized by a combination of a hardware configuration and a software configuration.

The communication I/F 34 is, for example, a network interface, and controls transmission of various kinds of information to and from the management device 11 through the network. An example of a network is a WAN such as the Internet or a public communication network. The communication I/F 34 performs communication between the surveillance camera 10 and the management device 11.

The secondary storage device 42 is a non-volatile memory and stores various kinds of information under the control of the CPU 37. Examples of the secondary storage device 42 include a flash memory, SSD, EEPROM, HDD, and the like.

The UI device 43 includes a reception device 43A and a display 43B. The reception device 43A is, for example, a hard key, a touch panel, or the like, and receives various commands from the user. The CPU 37 acquires various commands received by the reception device 43A and operates in accordance with the acquired commands.

The display 43B displays various kinds of information under the control of the CPU 37. Examples of the various kinds of information displayed on the display 43B include the contents of various commands received by the reception device 43A, a digital image, and the like.

Figure 3:
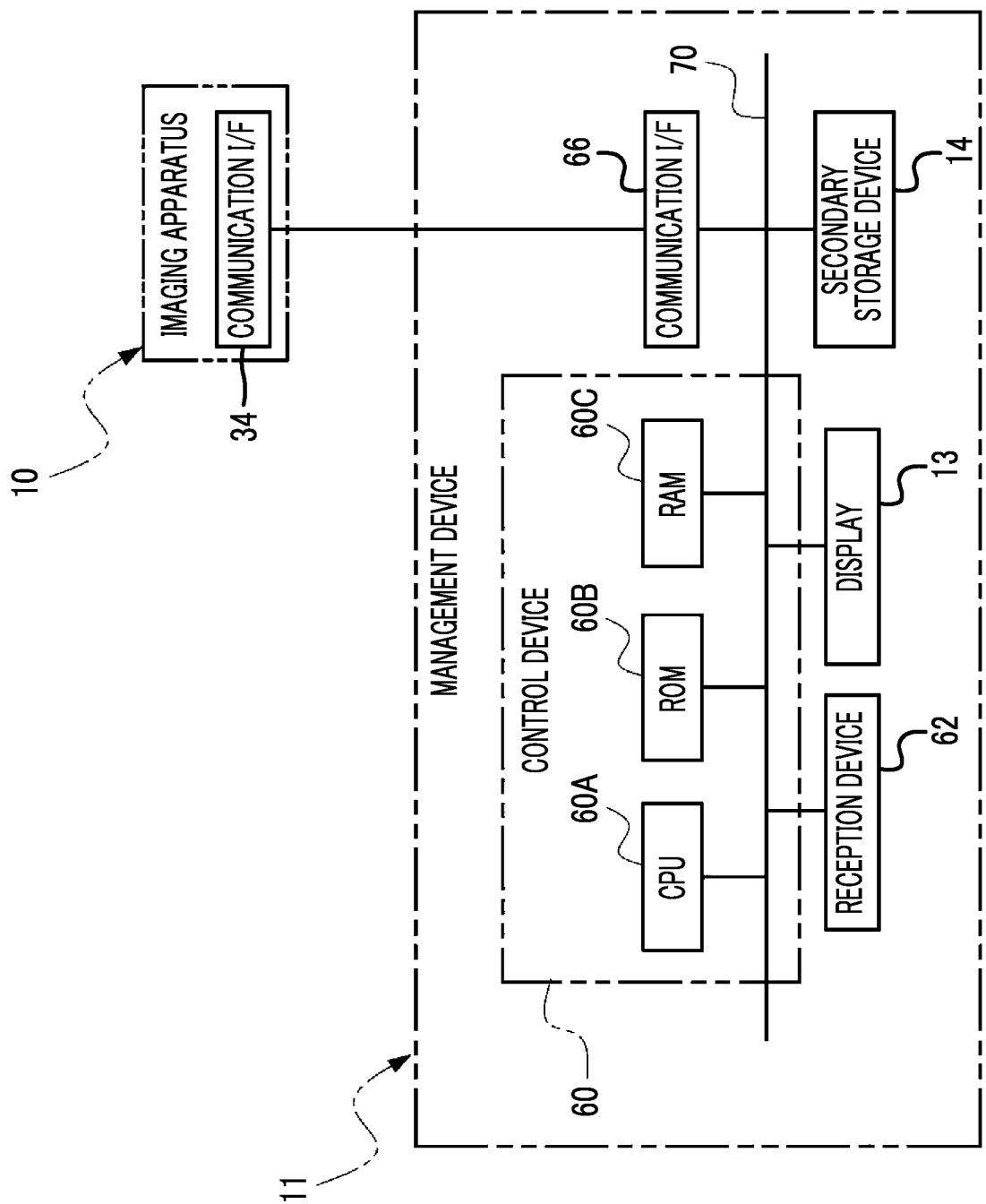
FIG. 3 is a block diagram showing an example of a configuration of an electrical system of a management device according to the embodiment.

As an example, as shown in FIG. 3, the management device 11 comprises a display 13, a secondary storage device 14, a control device 60, a reception device 62, and a communication I/F 66. The control device 60 comprises a CPU 60A, a ROM 60B, and a RAM 60C. Each of the reception device 62, the display 13, the secondary storage device 14, the CPU 60A, the ROM 60B, the RAM 60C, and the communication I/F 66 is connected to the bus line 70.

Various programs for the management device 11 (hereinafter, simply referred to as "management device programs") are stored in the ROM 60B. The CPU 60A reads the management device program from the ROM 60B, and develops the read management device program into the RAM 60C. The CPU 60A controls the entire management device 11 in accordance with the management device program developed in the RAM 60C.

The communication I/F 66 is, for example, a network interface. The communication I/F 66 is communicably connected to the communication I/F 34 of the management device 11 through a network, and controls transmission of various kinds of information to and from the management device 11. For example, the communication I/F 66 requests the management device 11 to transmit a digital image, and receives the digital image transmitted from the communication I/F 34 of the management device 11 in response to the request for transmission of the digital image.

The reception device 62 is, for example, a keyboard, a mouse, a touch panel, or the like, and receives various commands from the user. The CPU 60A acquires various commands received by the reception device 62 and operates in accordance with the acquired commands.

The display 13 displays various kinds of information under the control of the CPU 60A. Examples of the various kinds of information displayed on the display 13 include the contents of various commands received by the reception device 62, the digital image received by the communication I/F 66, and the like.

The secondary storage device 14 is a non-volatile memory and stores various kinds of information under the control of the CPU 60A. Examples of various kinds of information stored in the secondary storage device 14 include digital images received by the communication I/F 66.

In such a manner, the control device 60 performs control for displaying the digital image received by the communication I/F 66 on the display 13, and performs control for storing the digital image received by the communication I/F 66 in the secondary storage device 14.

Here, the digital image is displayed on the display 13 and the digital image received by the communication I/F 66 is stored in the secondary storage device 14, but the technique of the present disclosure is not limited to this. For example, either the display of the digital image on the display 13 or the storage of the digital image in the secondary storage device 14 may be performed.

Figure 4:
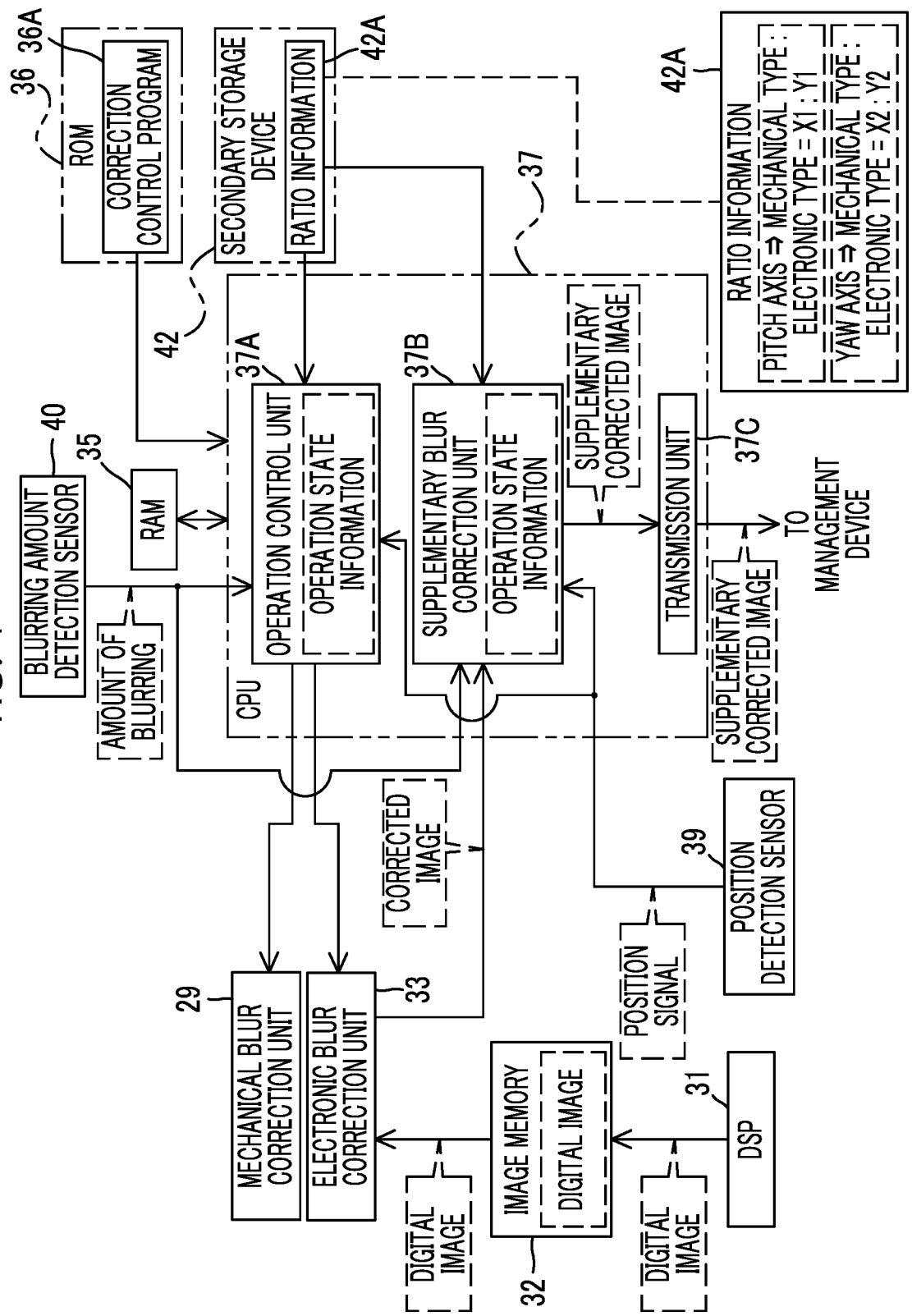
FIG. 4 is a functional block diagram showing an example of CPU functions included in the surveillance camera according to the embodiment.

As an example, as shown in FIG. 4, the correction control program 36A is stored in the ROM 36. The CPU 37 reads the correction control program 36A from the ROM 36, and develops the read correction control program 36A into the RAM 35. By executing the correction control program 36A developed in the RAM 35, the CPU 37 operates as an operation control unit 37A, a supplementary blur correction unit 37B, and a transmission unit 37C. The supplementary blur correction unit 37B is an example of the "supplementary blur correction unit (supplementary blur correction circuit)" relating to the technique of the present disclosure. The supplementary blur correction unit 37B is a processor that performs blur correction processing which is supplementary (supplementary blur correction processing).

The ratio information 42A is stored in the secondary storage device 42. The ratio information 42A is information indicating a predetermined ratio (hereinafter, simply referred to as "ratio") used in a case where the mechanical blur correction unit 29 and the electronic blur correction unit 33 are shared and operated at the predetermined ratio during the exposure of the imaging element 25. The term "exposure" described herein means that the subject is being exposed within one frame. Further, assuming that the degree of correction capable of completely eliminating the amount of blurring detected by the blurring amount detection sensor 40 is "10", the term "ratio" described herein is a ratio indicating which percentage of "10" is allocated to the mechanical blur correction unit 29 and the electronic blur correction unit 33.

The ratio is determined depending on each of the pair of axial directions. That is, the ratio is determined depending on each of the pitch axis PA direction and the yaw axis YA direction. In the example shown in FIG. 3, the ratio in the pitch axis PA direction is "mechanical blur correction unit 29: electronic blur correction unit 33=X1:Y1", and the ratio in the yaw axis YA direction is "mechanical blur correction unit 29: electronic blur correction unit 33=X2:Y2". In a case where the movable range of the anti-oscillation lens 15B1 in the pitch axis PA direction is limited, it is difficult for the mechanical blur correction unit 29 to correct all the amount of blurring. Therefore, for example, "X1" is set to "6" indicates the degree of correction that can be corrected in the movable range, and "X2" is set to "4". The ratios "X2" and "Y2" in the yaw axis YA direction can also be determined by the same method as "X1" and "X2".

The operation control unit 37A acquires the ratio information 42A from the secondary storage device 42. Further, the operation control unit 37A acquires the amount of blurring from the blurring amount detection sensor 40. Further, the operation control unit 37A acquires a position signal from the position detection sensor 39.

The operation control unit 37A shares and operates the mechanical blur correction unit 29 and the electronic blur correction unit 33 at the ratio indicated by the ratio information 42A during the exposure of the imaging element 25. In the mechanical blur correction unit 29, the anti-oscillation lens 15B1 is moved, in each of the pitch axis PA direction and the yaw axis YA direction, in two-dimensional plane of the above-mentioned anti-oscillation lens, based on the blurring amount determined depending on the ratio of the amount of blurring detected by the blurring amount detection sensor 40. By moving the anti-oscillation lens 15B1 in the two-dimensional plane of the anti-oscillation lens, blurring is corrected.

The operation control unit 37A acquires position signals from the position detection sensor 39 a plurality of times during the exposure of the imaging element 25, and generate operation state information about the operation state of the anti-oscillation lens 15B1 during the exposure of the imaging element 25, from the acquired plurality of position signals. Examples of the operation state information include information including information capable of specifying the movement locus of the optical axis of the anti-oscillation lens 15B1 in the two-dimensional plane of the anti-oscillation lens during exposure of the imaging element 25. The information capable of specifying the movement locus includes two-dimensional coordinates capable of specifying the position of the anti-oscillation lens in the two-dimensional plane. The operation state information is generated for each of the pitch axis PA direction and the yaw axis YA direction. The above-mentioned "movement locus" is an example of the "movement locus of the optical element during the exposure period" relating to the technique of the present disclosure.

Further, here, the movement locus of the optical axis of the anti-oscillation lens 15B1 in the two-dimensional plane of the anti-oscillation lens is illustrated, but the technique of the present disclosure is not limited to this. For example, instead of the movement locus of the optical axis of the anti-oscillation lens 15B1, the movement locus may be a movement locus of the center of the upper end surface or the center of the lower end surface of the anti-oscillation lens 15B1, and a movement locus of the anti-oscillation lens 15B1.

The electronic blur correction unit 33 acquires a digital image for one frame from the image memory 32. The electronic blur correction unit 33 performs image processing on the digital image for one frame, based on the amount of blurring determined depending on the operation state information and the ratio of the amounts of blurring detected by the blurring amount detection sensor 40 for each of the pitch axis PA direction and the yaw axis YA direction. By performing image processing (details will be described later) on the digital image for one frame in such a manner, blurring is corrected. The corrected image obtained by correcting the blurring for the digital image for one frame by the electronic blur correction unit 33 is output to the supplementary blur correction unit 37B.

Similarly to the operation control unit 37A, the supplementary blur correction unit 37B acquires position signals from the position detection sensor 39 a plurality of times, and generates operation state information from the acquired plurality of position signals. Further, similarly to the operation control unit 37A, the supplementary blur correction unit 37B acquires the ratio information 42A from the secondary storage device 42. Further, similarly to the operation control unit 37A, the supplementary blur correction unit 37B acquires the amount of blurring from the blurring amount detection sensor 40. Further, the supplementary blur correction unit 37B acquires the exposure period of the imaging element 25 (hereinafter, also simply referred to as "exposure period"). The exposure period is a period in which the imaging element 25 is exposed, and is obtained by measuring the time from the start timing of the exposure to the imaging element 25 to the end timing of the exposure. In the following, the start timing of exposure to the imaging element 25 is simply referred to as "exposure start timing", and the end timing of exposure to the imaging element 25 is simply referred to as "exposure end timing".

The supplementary blur correction unit 37B acquires a corrected image from the electronic blur correction unit 33. The supplementary blur correction unit 37B corrects blurring by applying a filter determined depending on the operation state information, the ratio indicated by the ratio information 42A, the amount of blurring, and the exposure period to the corrected image. The supplementary corrected image obtained by correcting the blurring on the corrected image by the supplementary blur correction unit 37B is output to the transmission unit 37C. The transmission unit 37C transmits the supplementary corrected image to the management device 11.

The electronic blur correction unit 33 employs processing including image cutout processing as an example of image processing for a digital image. The image cutout processing refers to processing of cutting out a digital image in accordance with the cutout position determined depending on the operation state information, the ratio indicated by the ratio information 42A, and the amount of blurring. That is, the image cutout processing is processing of cutting out a part of the image region as a corrected image from the digital image stored in the image memory 32 based on the operation state information, the ratio indicated by the ratio information 42A, and the amount of blurring.

Figure 5:
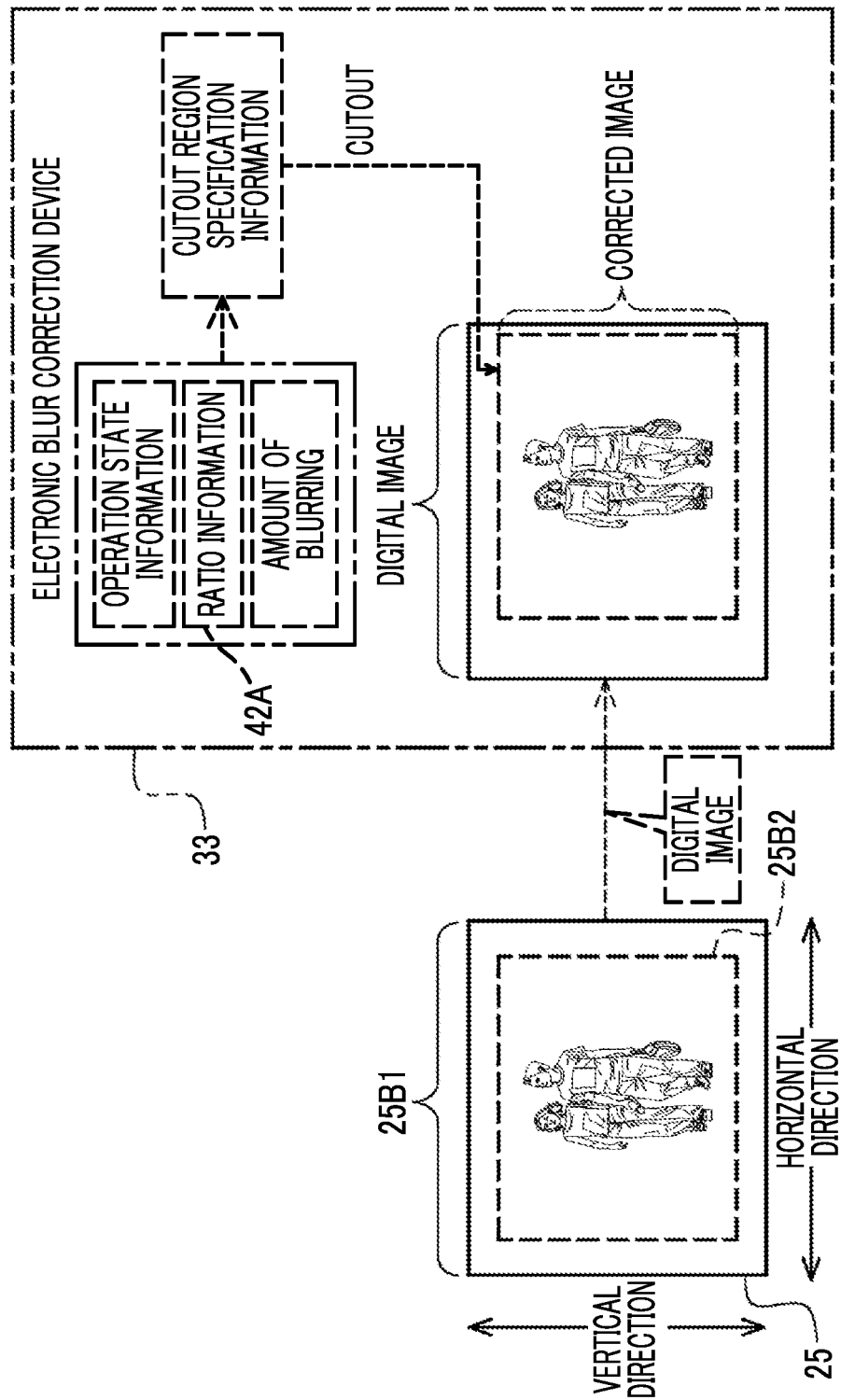
FIG. 5 is a conceptual diagram showing an example of processing contents of an electronic blur correction unit included in the surveillance camera according to the embodiment.

In a case where the image cutout processing is performed, as shown in FIG. 5 as an example, imaging is performed after an imaging region 25B1 of the imaging element 25 is set to be larger than a region 25B2 which is output as a digital image of which blurring is corrected (hereinafter, simply referred to as "image output region 25B2"). The electronic blur correction unit 33 generates cutout region specification information based on the operation state information, the ratio indicated by the ratio information 42A, and the amount of blurring. The cutout region specification information refers to information that specifies an image region to be cut out as a corrected image in a digital image. Then, the electronic blur correction unit 33 cuts out the image region specified by the cutout region specification information as a corrected image from the digital image stored in the image memory 32.

Figure 6:
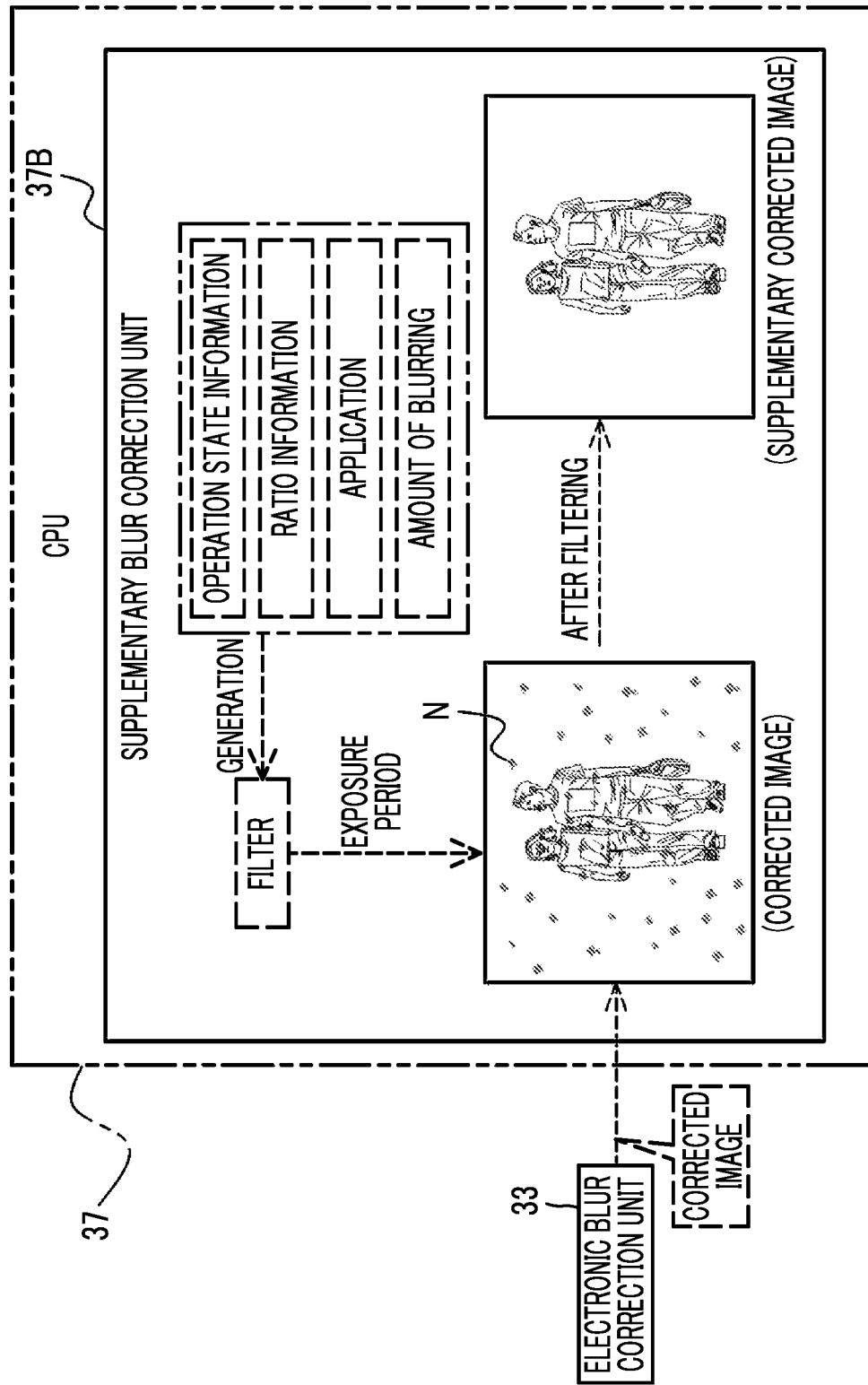
FIG. 6 is a conceptual diagram showing an example of processing contents of a supplementary blur correction unit realized by a CPU included in the surveillance camera according to the embodiment.

By the way, as shown in FIG. 6, as an example, noise N appears in the corrected image obtained by performing image processing on the digital image by the electronic blur correction unit 33. The noise N is caused by blurring of the imaging element 25 during exposure. The image cutout processing performed by the electronic blur correction unit 33 is processing of cutting out a part of an image region (a part of a digital image) as a corrected image from a digital image, and does not correspond to blurring occurring during exposure. Therefore, the noise N appears in the corrected image due to blurring during exposure.

Therefore, in the present embodiment, for the blur correction, the supplementary blur correction unit 37B performs supplementary processing of removing the noise N from the corrected image. That is, the supplementary blur correction unit 37B generates a filter in accordance with the operation state information, the ratio indicated by the ratio information 42A, the amount of blurring, and the exposure period. The "filter" described herein is a filter that removes noise N that appears in the supplementary image due to blurring occurring during exposure.

The filter is, for example, an FIR filter. The FIR filter itself is a series of real values including positive and negative, the number of rows in the series is called the number of taps, and the real value itself is called the tap coefficient. In the supplementary blur correction unit 37B, a calculation expression for determining the tap coefficient is predetermined in which the operation state information, the ratio indicated by the ratio information 42A, the amount of blurring, and the exposure period each are an independent variable, and the tap coefficient is a dependent variable. Thus, the tap coefficient is determined using the calculation expression for determining the tap coefficient.

The calculation expression for determining the tap coefficient is, for example, a calculation expression derived in advance as a calculation expression for removing the noise N appearing in the corrected image based on the result of performing a test and/or a simulation by an actual machine. In addition, for example, the phrase "noise N is removed" described herein means that a digital image in which the signal-to-noise ratio (SNR) is infinite, that is, a digital image which does not include blurring including noise N can be obtained.

In the supplementary blur correction unit 37B, the noise N is removed from the corrected image by applying the FIR filter, which has the tap coefficient determined by using the calculation expression for determining the tap coefficient, to the corrected image. That is, the noise N is removed from the corrected image by performing a convolution operation (multiply-accumulate calculation) on the corrected image with the tap coefficient determined by using the calculation expression for determining the tap coefficient. By filtering the corrected image with the FIR filter in such a manner, a supplementary corrected image in which the noise N is removed from the corrected image is generated.

In the present embodiment, an example in which the tap coefficient is determined by using the calculation expression for determining the tap coefficient is described. However, the tap coefficient may be determined using a tap coefficient determination table in which the operation state information, the ratio indicated by the ratio information 42A, the amount of blurring, the exposure period, and the tap coefficient are associated with each other. Further, although the FIR filter is illustrated here, the technique of the present disclosure is not limited to this, and for example, an IIR filter may be used. In such a case, instead of the tap coefficient, the parameters used in the IIR filter may be determined from the operation state information, the ratio indicated by the ratio information 42A, the amount of blurring, and the exposure period, using an arithmetic expression or a table.

Figure 7:
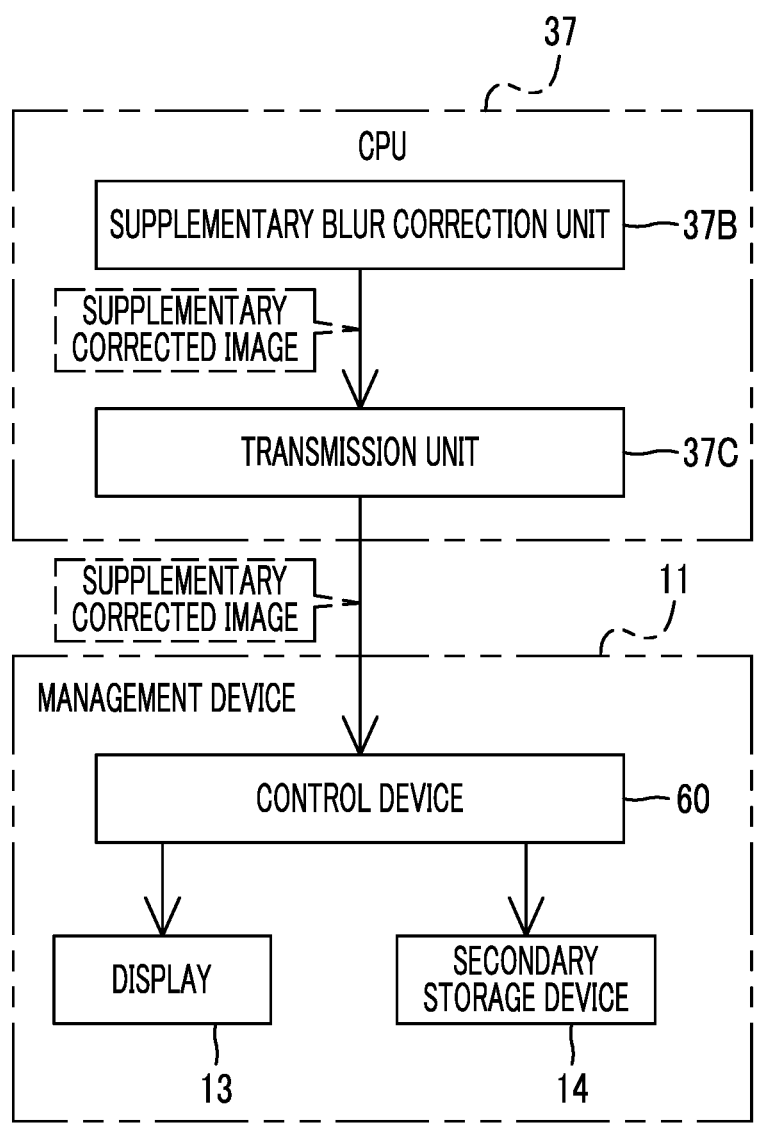
FIG. 7 is a conceptual diagram for explaining the processing contents of the supplementary corrected image transmitted to the management device from the surveillance camera according to the embodiment.

In the surveillance camera 10, the supplementary blur correction unit 37B generates a supplementary corrected image for each digital image obtained through imaging of the monitoring target by the imaging element 25 at a predetermined frame rate. As an example, as shown in FIG. 7, supplementary corrected images obtained by reflecting the correction result of the supplementary blur correction unit 37B in the digital image are sequentially input to the transmission unit 37C. The transmission unit 37C transmits each supplementary corrected image which is input from the supplementary blur correction unit 37B to the management device 11.

In the management device 11, the supplementary corrected images transmitted from the transmission unit 37C are sequentially input to the control device 60. Then, the display 13 displays the supplementary corrected images, which are sequentially input to the control device 60, as a live view image under the control of the control device 60, and the secondary storage device 14 stores the supplementary corrected images, which are sequentially input to the control device 60, under the control of the control device 60. Here, an example in which both the display of the supplementary corrected image and the storage of the supplementary corrected image are performed is given. However, the technique of the present disclosure is not limited to this, and either of the display of the supplementary corrected image or the storage of the supplementary corrected image may be performed. The control device 60 is an example of a "control device" relating to the technique of the present disclosure.

Figure 8:
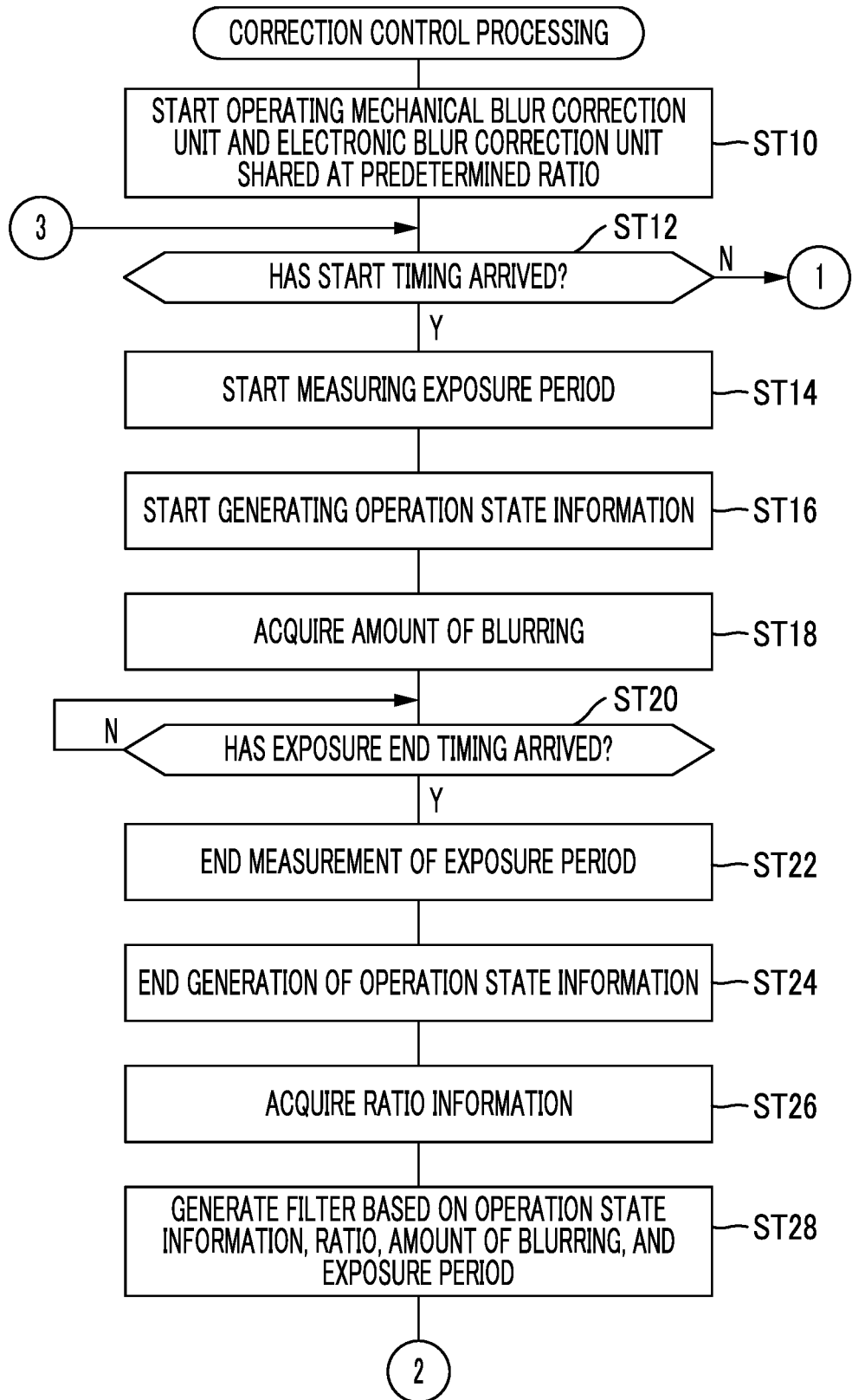
FIG. 8 is a flowchart showing an example of a flow of correction control processing according to the embodiment.
Figure 9:
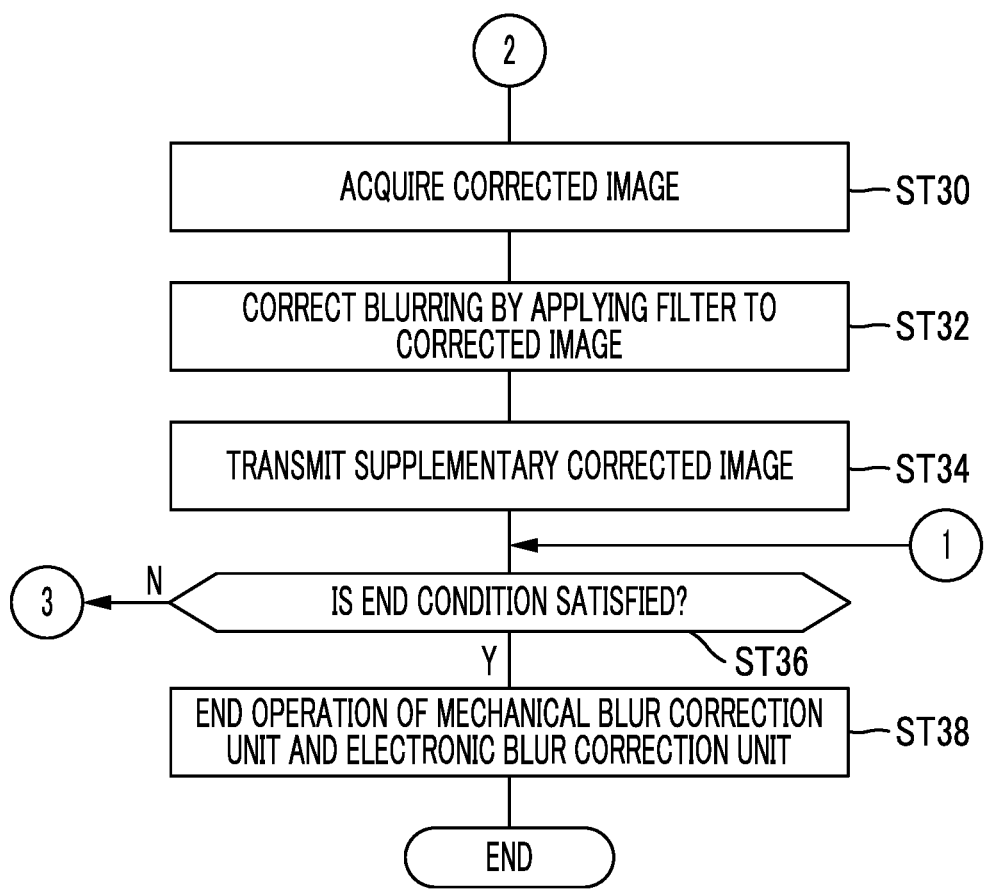
FIG. 9 is a continuation of the flowchart shown in FIG. 8.

Next, the operation of the part of the monitoring system 2 relating to the technique of the present disclosure will be described with reference to FIGS. 8 and 9. FIGS. 8 and 9 show an example of the flow of correction control processing executed by the CPU 37.

In the correction control processing shown in FIG. 8, first, in step ST10, the operation control unit 37A starts the operation of the mechanical blur correction unit 29 and the operation of the electronic blur correction unit 33 shared at a predetermined ratio. Then, the correction control processing proceeds to step ST12.

By executing the processing of this step ST10, the mechanical blur correction unit 29 corrects the blurring by moving the anti-oscillation lens 15B1 based on the amount of blurring detected by the blurring amount detection sensor 40. Further, the electronic blur correction unit 33 corrects blurring by performing image processing on a digital image for one frame based on the latest operation state information and the amount of blurring detected by the blurring amount detection sensor 40, and thereby generates a corrected image.

In step ST12, the supplementary blur correction unit 37B determines whether or not the exposure start timing has arrived. In a case where the exposure start timing has not arrived in step ST12, the determination is denied, and the correction control processing proceeds to step ST36 shown in FIG. 9. In a case where the exposure end timing has arrived in step ST12, the determination is affirmed, and the correction control processing proceeds to step ST14.

In step ST14, the supplementary blur correction unit 37B starts measuring the exposure period, and then the correction control processing proceeds to step ST16.

In step ST16, the supplementary blur correction unit 37B starts generating operation state information based on the position signal from the position detection sensor 39, and then the correction control processing proceeds to step ST18.

In step ST18, the supplementary blur correction unit 37B acquires the amount of blurring from the blurring amount detection sensor 40, and then the correction control processing proceeds to step ST20.

In step ST20, the supplementary blur correction unit 37B determines whether or not the exposure end timing has arrived. In a case where the exposure end timing has not arrived in step ST20, the determination is denied, and the determination in step ST20 is performed again. In a case where the exposure end timing has arrived in step ST20, the determination is affirmed, and the correction control processing proceeds to step ST22.

In step ST22, the supplementary blur correction unit 37B ends the measurement of the exposure period, and then the correction control processing proceeds to step ST24.

In step ST24, the supplementary blur correction unit 37B ends generation of the operation state information based on the position signal from the position detection sensor 39, and then the correction control processing proceeds to step ST26.

In step ST26, the supplementary blur correction unit 37B acquires the ratio information 42A from the secondary storage device 42, and then the correction control processing proceeds to step ST28.

In step ST28, the supplementary blur correction unit 37B generates a filter (for example, the FIR filter described above) based on the operation state information, the ratio indicated by the ratio information 42A, the amount of blurring, and the exposure period, and then the correction control processing proceeds to step ST30 shown in FIG. 9.

The operation state information used in this step ST28 is the operation state information obtained in step ST24. Further, the ratio information 42A used in this step ST28 is the ratio information 42A acquired in step ST26. The amount of blurring used in this step ST28 is the amount of blurring acquired in step ST18. Further, the exposure period used in this step ST28 is the exposure period measured in step ST22.

In step ST30 shown in FIG. 9, the supplementary blur correction unit 37B acquires the corrected image generated by the electronic blur correction unit 33 during the exposure period, and then the correction control processing proceeds to step ST32.

In step ST32, the supplementary blur correction unit 37B corrects blurring by applying the filter generated in step ST28 to the corrected image acquired in step ST30. That is, the supplementary blur correction unit 37B removes the noise N in the corrected image by applying the filter generated in step ST28 to the corrected image acquired in step ST30. After the processing of step ST32 is executed, the correction control processing proceeds to step ST34.

In step ST34, the transmission unit 37C transmits the supplementary corrected image, which is obtained by removing the noise N in the corrected image, by executing the processing of step ST32 to the management device 11, and then the correction control processing proceeds to step ST36.

In step ST36, the operation control unit 37A determines whether or not the condition for ending the correction control processing (hereinafter, referred to as "correction control processing end condition") is satisfied. Examples of the correction control processing end condition include a condition that the reception device 43A has received a command to end the correction control processing. In a case where the correction control processing end condition is not satisfied in step ST36, the determination is denied, and the correction control processing proceeds to step ST12 shown in FIG. 8. In a case where the correction control processing end condition is satisfied in step ST36, the determination is affirmed, and the correction control processing proceeds to step ST38.

In step ST38, the operation control unit 37A ends the operation of the mechanical blur correction unit 29 and the operation of the electronic blur correction unit 33, and then the correction control processing ends.

As described above, in the surveillance camera 10, blurring is corrected by moving the anti-oscillation lens 15B1 based on amount of blurring detected by blurring amount detection sensor 40. Further, the electronic blur correction unit 33 corrects the blurring by performing image processing on the digital image based on the operation state information and the amount of blurring. The blur correction method by the electronic blur correction unit 33 is a correction method realized by cutting out a digital image according to the amount of blurring, and is not a correction method corresponding to blurring occurring during exposure.

Therefore, in the surveillance camera 10, in order to correct blurring occurring during the exposure, in a case where the mechanical blur correction unit 29 and the electronic blur correction unit 33 are shared and operated at a predetermined ratio during the exposure, a filter is generated in accordance with the operation state information, the predetermined ratio, the amount of blurring, and the exposure period. Then, the supplementary blur correction unit 37B corrects the blurring by applying the filter to the corrected image. That is, the noise N in the corrected image is removed by applying the filter to the corrected image.

Therefore, according to the surveillance camera 10, in a case where the mechanical blur correction unit 29 and the electronic blur correction unit 33 share the correction of blurring, it is possible to remove the noise N, which appears in the corrected image due to the blurring occurring during exposure, without relying on the mechanical blur correction unit 29.

Further, in the surveillance camera 10, as a filter applied to the corrected image by the electronic blur correction unit 33, a filter for removing the noise N, which appears in the corrected image due to the blurring occurring during exposure, is employed. Therefore, it is possible to easily remove the noise N appearing in the corrected image due to blurring occurring during the exposure, as compared with the case of removing the noise N without using the filter.

Further, in the surveillance camera 10, the operation state information is information about the operation state of the anti-oscillation lens 15B1 during exposure within one frame. The filter is determined depending on the operation state information, the ratio, the amount of blurring, and the exposure period in a case where the mechanical blur correction unit 29 and the electronic blur correction unit 33 are shared and operated at a predetermined ratio during the exposure in one frame. Therefore, in a case where the mechanical blur correction unit 29 and the electronic blur correction unit 33 share the correction of blurring, it is possible to remove the noise N which appears in the corrected image for one frame due to the blurring occurring during the exposure within one frame, without relying on the mechanical blur correction unit 29.

Further, in the surveillance camera 10, information including information capable of specifying the movement locus of the anti-oscillation lens 15B1 during the exposure period is employed as the operation state information. Therefore, it is possible to remove the noise N in the corrected image with higher accuracy than in the case of removing the noise N in the corrected image by using information regardless of the movement locus of the anti-oscillation lens 15B1 during the exposure period.

Further, the surveillance camera 10 generates a corrected image by performing image cutout processing for cutting out a digital image in accordance with the cutout position determined depending on the operation state information, the predetermined ratio, and the amount of blurring. Therefore, the blurring can be corrected with higher accuracy than in the case where the processing of cutting out the digital image is performed in accordance with the cutout position determined regardless of the operation state information, the predetermined ratio, and the amount of blurring.

Further, in the surveillance camera 10, blurring is corrected by moving the anti-oscillation lens 15B1. Therefore, the blurring can be corrected within the movable range of the anti-oscillation lens 15B1.

Further, in the surveillance camera 10, the amount of blurring is detected in each of the pitch axis PA direction and the yaw axis YA, and a predetermined ratio is determined depending on each of the pitch axis PA direction and the yaw axis YA. Therefore, the blurring can be corrected with higher accuracy than in the case where the blurring is corrected by using only the amount of blurring in one axial direction.

In the above embodiment, an example in which blurring is corrected by moving the anti-oscillation lens 15B1 has been described, but the technique of the present disclosure is not limited to this. For example, instead of the anti-oscillation lens 15B1, the imaging element 25 may be moved in a plane parallel to the two-dimensional plane of the anti-oscillation lens to correct the blurring. In such a case, blurring can be corrected within the movable range of the imaging element 25. Further, in such a case, since the anti-oscillation lens 15B1 is unnecessary, the optical system 15 can be miniaturized.

Further, the blurring may be corrected by moving both the anti-oscillation lens 15B1 and the imaging element 25. In such a case, blurring can be corrected within the movable range of each of the anti-oscillation lens 15B1 and the imaging element 25. Further, in such a case, it is possible to correct the blurring, which could not be corrected due to the movement of the anti-oscillation lens 15B1 restricted by the movable range of the anti-oscillation lens 15B1, by moving the imaging element 25.

Figure 10:
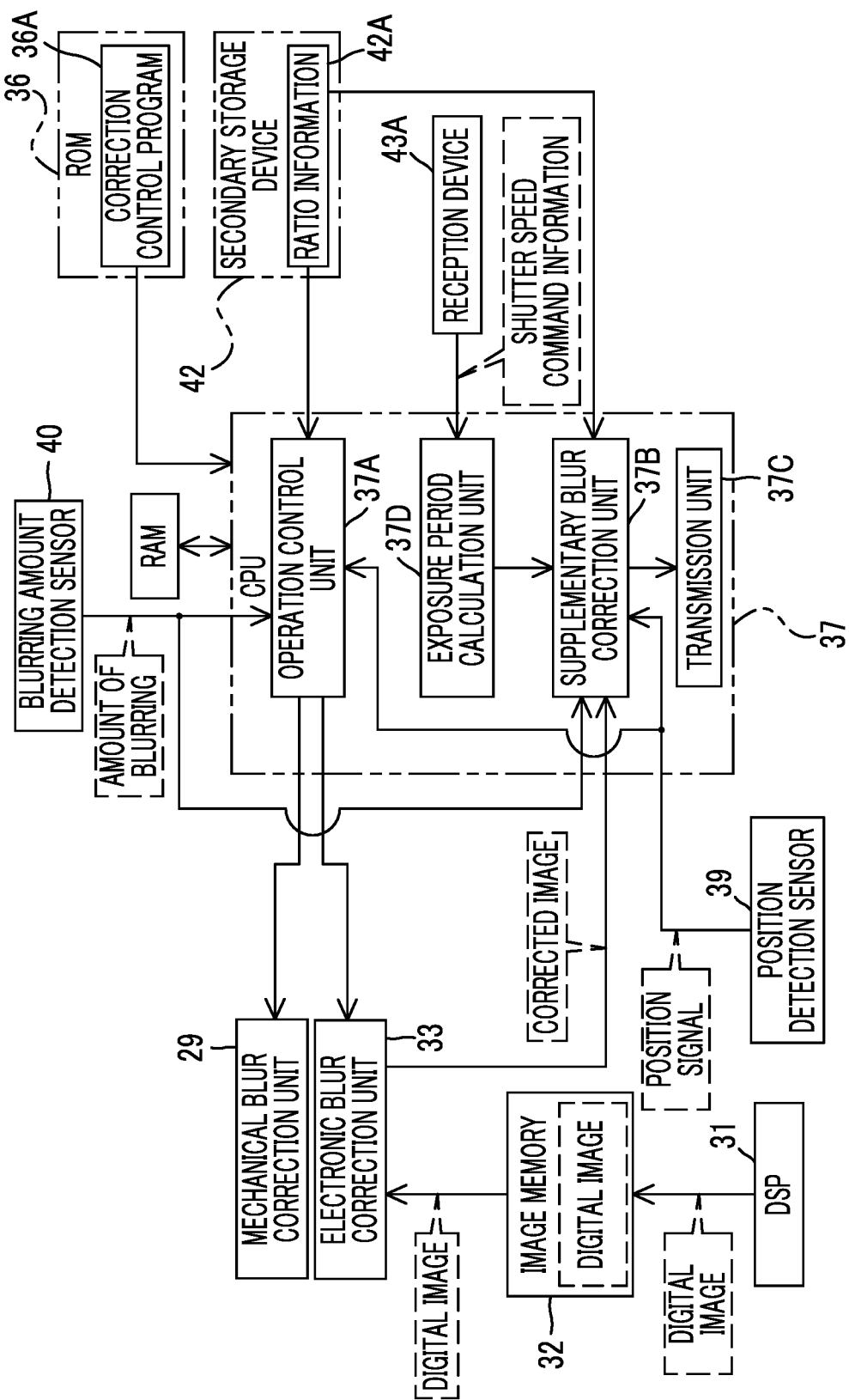
FIG. 10 is a functional block diagram showing a modification example of CPU functions included in the surveillance camera according to the embodiment.

Further, in the above embodiment, an example in which the exposure period is measured in real time by the supplementary blur correction unit 37B has been described. However, the technique of the present disclosure is not limited to this, and for example, the exposure period may be calculated in advance. In such a case, as shown in FIG. 10 as an example, the CPU 37 has an exposure period calculation unit 37D. In a case where the reception device 43A receives the shutter speed command information for giving a command for the shutter speed, the exposure period calculation unit 37D calculates the exposure period based on the shutter speed corresponding to the command of the shutter speed command information. The supplementary blur correction unit 37B generates a filter based on the exposure period calculated by the exposure period calculation unit 37D, the operation state information, the predetermined ratio, and the amount of blurring.

Further, in the above embodiment, the amount of blurring is detected in each of the pair of axial directions, and the ratio is determined depending on the axial direction, but the technique of the present disclosure is not limited to this. For example, as shown in FIG. 11, the ratio may be determined depending on the frequency of the blurring.

Figure 11:
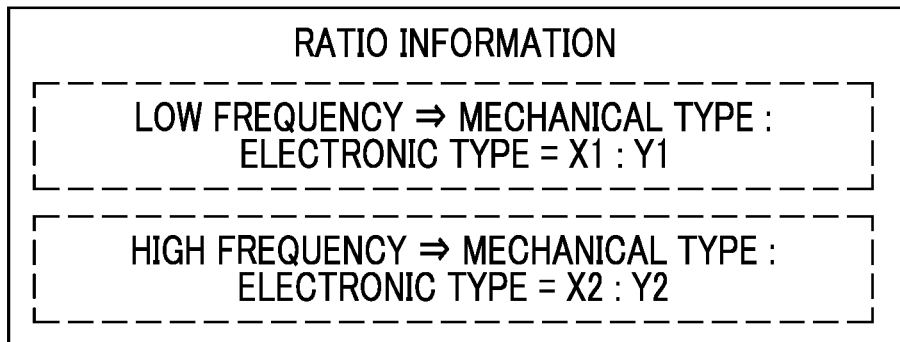
FIG. 11 is a conceptual diagram showing a modification example of ratio information used in the surveillance camera according to the embodiment.

In the example shown in FIG. 11, the blurring frequency is divided into a low frequency and a high frequency. The ratio at the low frequency is "mechanical blur correction unit 29: electronic blur correction unit 33=X1:Y1", and the ratio at the high frequency is "mechanical blur correction unit 29:

electronic blur correction unit 33=X2:Y2". In such a case, the amount of blurring is detected for each of the low frequency and the high frequency. The amount of blurring at the low frequency may be extracted from the amount of blurring detected by the blurring amount detection sensor 40 using a low-pass filter, and the amount of blurring at the high frequency may be extracted from the amount of blurring detected by the blurring amount detection sensor 40 using a high-pass filter. The threshold value for separating the low frequency and the high frequency may be a fixed value or a variable value that can be changed in accordance with the command received by the reception device 43A.

In such a manner, by detecting the amount of blurring for each of the low frequency and the high frequency, it is possible to correct blurring with higher accuracy than in a case where amount of blurring is corrected using only the amount of blurring for one frequency.

In addition, although the frequency is divided into low frequency and high frequency here, the technique of the present disclosure is not limited to this. Even in a case where the frequency is divided into three or more frequencies, the amount of blurring may be detected by the same method and the ratio may be determined.

Further, in the above embodiment, as the operation state information, information including information capable of specifying the movement locus of the anti-oscillation lens 15B1 is exemplified, but the technique of the present disclosure is not limited to this. The operation state information may include at least one of a period in which the anti-oscillation lens 15B1 is moving during the exposure period or a period in which the anti-oscillation lens 15B1 is not moving during the exposure period. As a result, as compared with the case where neither the period in which the anti-oscillation lens 15B1 is moving during the exposure period or the period in which the anti-oscillation lens 15B1 is moving during the exposure period is included in the operation state information, it is possible to improve the accuracy of blur correction by each of the electronic blur correction unit 33 and the supplementary blur correction unit 37B.

Further, the above embodiment has described a mode example in which a filter is generated for each frame, and the generated filter is applied to the corrected image of the corresponding one frame. However, the technique of the present disclosure is not limited to this. For example, one filter may be used across a plurality of frames. Further, the same filter may be used continuously only in a predetermined time zone. The "predetermined time zone" described herein may be, for example, a time zone determined depending on the command received by the reception device 43A, or may be a fixed time zone.

Further, the filter may be generated every plurality of frames. In such a case, for example, a filter may be generated every frame for a time zone in which oscillation occurs relatively frequently, and a filter may be generated every the plurality of frames for a time zone in which oscillation occurs relatively infrequently.

The "relatively high time zone" and "relatively low time zone" described herein may be determined based on statistical data obtained by analyzing a plurality of past digital images accumulated by imaging the monitoring target by the surveillance camera 10. Further, the "relatively high time zone" and the "relatively low time zone" may be fixed, or may be a time zone that can be changed in accordance with the command received by the reception device 43A or the like.

Figure 12:
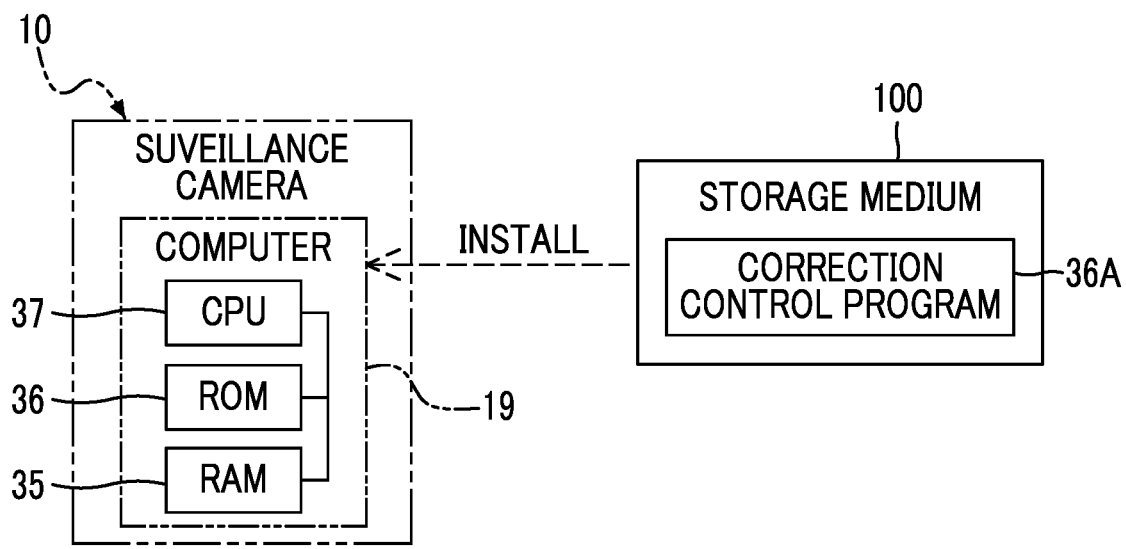
FIG. 12 is a conceptual diagram showing an example of a mode in which a correction control program is installed in a computer in a surveillance camera from a storage medium in which the correction control program according to the embodiment is stored.

Further, in the above embodiment, the example in which the correction control program 36A is stored in the ROM 36 has been described, but the technique of the present disclosure is not limited to this. For example, as shown in FIG. 12, the correction control program 36A may be stored in the storage medium 100. In such a case, the correction control program 36A stored in the storage medium 100 is installed in the computer 19, and the CPU 37 executes the correction control processing described above according to the correction control program 36A. The storage medium 100 is a non-temporary storage medium. An example of the storage medium 100 is an optional portable storage medium such as an SSD or a USB memory.

In the example shown in FIG. 12, the CPU 37 is a single CPU, but the technique of the present disclosure is not limited to this, and a plurality of CPUs may be employed.

Further, the correction control program 36A may be stored in a storage unit of another computer or server device connected to the computer 19 through a communication network (not shown), and the correction control program 36A may be downloaded to computer 19 in response to the above-mentioned request of the surveillance camera 10. In such a case, the downloaded correction control program 36A is executed by the CPU 37 of the computer 19.

Further, in the above embodiment, the CPU 37 has been illustrated, but the technique of the present disclosure is not limited to this, and a plurality of CPUs may be used.

Further, in the above embodiment, the operation control unit 37A, the supplementary blur correction unit 37B, and the transmission unit 37C have been described with reference to a configuration example realized by a software configuration by a computer 19, but the technique of the present disclosure is not limited to this. For example, the operation control unit 37A, the supplementary blur correction unit 37B, and the transmission unit 37C may be realized by a device including, for example, an ASIC, an FPGA, and/or a PLD. Further, the operation control unit 37A, the supplementary blur correction unit 37B, and the transmission unit 37C may be realized by a combination of a hardware configuration and a software configuration.

As the hardware resource for executing the above correction control processing, the following various processors can be used. Examples of the processor include, as described above, software, that is, a CPU, which is a general-purpose processor that functions as a hardware resource for executing correction control processing by executing a program. Further, examples of the processor include a dedicated electric circuit which is a processor having a circuit configuration specially designed for executing a specific processing such as FPGA, PLD, or ASIC.

The hardware resource that executes the correction control processing may be composed of one of these various processors, or a combination of two or more processors of the same type or different types (for example, a combination of a plurality of FPGAs, or a combination of a CPU and an FPGA). Further, the hardware resource for executing the correction control processing may be one processor.

As an example of the configuration using one processor, first, as represented by a computer such as a client and server, there is a form in which one processor is composed of a combination of one or more CPUs and software and this processor functions as a hardware resource for executing each processing of the operation control unit 37A, the supplementary blur correction unit 37B, and the transmission unit 37C. Secondly, as typified by SoC, there is a form in which a processor that realizes the functions of the entire system including a plurality of hardware resources for executing the correction control processing with one IC chip is used. As described above, each processing of the operation control unit 37A, the supplementary blur correction unit 37B, and the transmission unit 37C is realized by using one or more of the above-mentioned various processors as hardware resources.

Furthermore, as the hardware structure of these various processors, more specifically, it is possible to use an electric circuit in which circuit elements such as semiconductor elements are combined.

Further, in the above embodiments, the surveillance camera 10 is described as an example of the imaging apparatus relating to the technique of the present disclosure, but the technique of the present disclosure is not limited to this. For example, instead of the surveillance camera 10, the technique of the present disclosure may be applied to various electronic devices such as a portable interchangeable lens camera, a portable fixed lens camera, a personal computer, a smart device, or a wearable terminal device. Even with these electronic devices, the same operations and effects as those of the surveillance camera 10 described in each of the above embodiments can be obtained.

Further, the above correction control processing is merely an example. Therefore, it is needless to say that unnecessary steps may be deleted, new steps may be added, or the processing order may be changed, without departing from the technical scope of the present disclosure.

The contents described and illustrated above are detailed explanations of the parts relating to the technique of the present disclosure, and are merely examples of the technique of the present disclosure. For example, the above description of the configuration, function, effect, and advantage is an example of the configuration, function, effect, and advantage of a portion relating to the technique of the present disclosure. Therefore, it is needless to say that unnecessary parts may be deleted, new elements may be added, or replacements may be made in the described contents and illustrated contents shown above without departing from the technical scope of the present disclosure. In addition, in order to avoid complications and facilitate understanding of the parts relating to the technique of the present disclosure, in the description contents and the illustrated contents shown above, the description about common technical knowledge and the like which require special explanation in order to enable the implementation of the technique of the present disclosure is not given.

As used herein, "A and/or B" is synonymous with "at least one of A or B". That is, "A and/or B" means that it may be only A, only B, or a combination of A and B. Further, in the present specification, in a case where three or more matters are connected and expressed by "and/or", the same concept as "A and/or B" is applied.

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. A blur correction device comprising:
    a sensor that detects an amount of blurring of an imaging apparatus;
    a mechanical blur correction device that corrects blurring by moving an optical element included in the imaging apparatus based on the amount of blurring;
    an electronic blur correction circuit that corrects the blurring by performing image processing on an image obtained through imaging of the imaging apparatus, based on the amount of blurring and operation state information about an operation state of the optical element during exposure in the imaging apparatus; and
    a supplementary blur correction circuit that, in a case where the mechanical blur correction device and the electronic blur correction circuit are shared and operated at a predetermined ratio during the exposure, corrects the blurring by applying, to the image, a filter determined depending on the operation state information, the predetermined ratio, the amount of blurring, and an exposure period in the imaging apparatus.

2. The blur correction device according to claim 1, wherein the filter is a filter that removes noise which appears in the image due to blurring occurring during the exposure.

3. The blur correction device according to claim 1, wherein the exposure is an exposure within one frame.

4. The blur correction device according to claim 1, wherein the operation state information is information including at least one of a period in which the optical element is moving during the exposure period or a period in which the optical element is not moving during the exposure period.

5. The blur correction device according to claim 1, wherein the operation state information is information including information that is capable of specifying a movement locus of the optical element during the exposure period.

6. The blur correction device according to claim 1, wherein the image processing is processing including processing of cutting out the image in accordance with a cutout position determined depending on the operation state information, the ratio, and the amount of blurring.

7. The blur correction device according to claim 1, wherein the optical element is at least one of an imaging element in which subject light indicating a subject is imaged by an optical member or the optical member.

8. The blur correction device according to claim 1,
    wherein the sensor detects the amount of blurring for each of a plurality of frequencies of the blurring, and
    the ratio is determined depending on the frequency.

9. The blur correction device according to claim 1,
    wherein the sensor detects the amount of blurring in each of a pair of axial directions, and
    the ratio is determined depending on the axial direction.

10. An imaging apparatus comprising:
    the blur correction device according to claim 1; and
    an image sensor that generates the image through imaging.

11. A monitoring system comprising:
    the imaging apparatus according to claim 10; and
    a control device that performs at least one of control of causing a display to display the image on which a correction result of the supplementary blur correction circuit is reflected or control of causing a memory to store image data indicating the image on which the correction result is reflected.

12. The blur correction device according to claim 2, wherein the exposure is an exposure within one frame.

13. The blur correction device according to claim 2, wherein the operation state information is information including at least one of a period in which the optical element is moving during the exposure period or a period in which the optical element is not moving during the exposure period.

14. The blur correction device according to claim 3, wherein the operation state information is information including at least one of a period in which the optical element is moving during the exposure period or a period in which the optical element is not moving during the exposure period.

15. The blur correction device according to claim 2, wherein the operation state information is information including information that is capable of specifying a movement locus of the optical element during the exposure period.

16. The blur correction device according to claim 3, wherein the operation state information is information including information that is capable of specifying a movement locus of the optical element during the exposure period.

17. The blur correction device according to claim 4, wherein the operation state information is information including information that is capable of specifying a movement locus of the optical element during the exposure period.

18. The blur correction device according to claim 2, wherein the image processing is processing including processing of cutting out the image in accordance with a cutout position determined depending on the operation state information, the ratio, and the amount of blurring.

19. The blur correction device according to claim 3, wherein the image processing is processing including processing of cutting out the image in accordance with a cutout position determined depending on the operation state information, the ratio, and the amount of blurring.

20. A non-transitory computer-readable storage medium storing a program for causing a computer to execute processing comprising:
  mechanical blur correction processing of correcting blurring by moving an optical element included in an imaging apparatus based on an amount of blurring detected by a sensor that detects the amount of blurring of the imaging apparatus;
  electronic blur correction processing of correcting the blurring by performing image processing on an image obtained through imaging of the imaging apparatus, based on the amount of blurring and operation state information about an operation state of the optical element during exposure in the imaging apparatus; and
  supplementary blur correction processing of correcting, in a case where the mechanical blur correction processing and the electronic blur correction processing are shared and operated at a predetermined ratio during the exposure, the blurring by applying, to the image, a filter determined depending on the operation state information, the predetermined ratio, the amount of blurring, and an exposure period in the imaging apparatus.

* * * * *